No. 630,590. Patented Aug. 8, 1899.
F. H. CATHCART.
ROTARY ENGINE.
(Application filed May 25, 1897.)
(No Model.) 9 Sheets—Sheet 1.
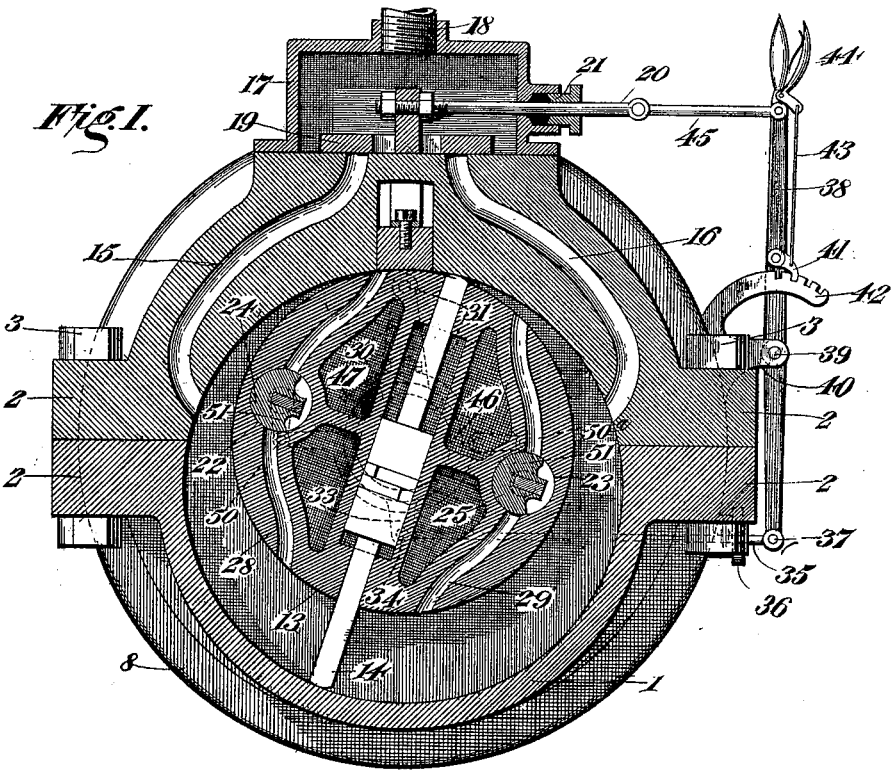
Fig. I.
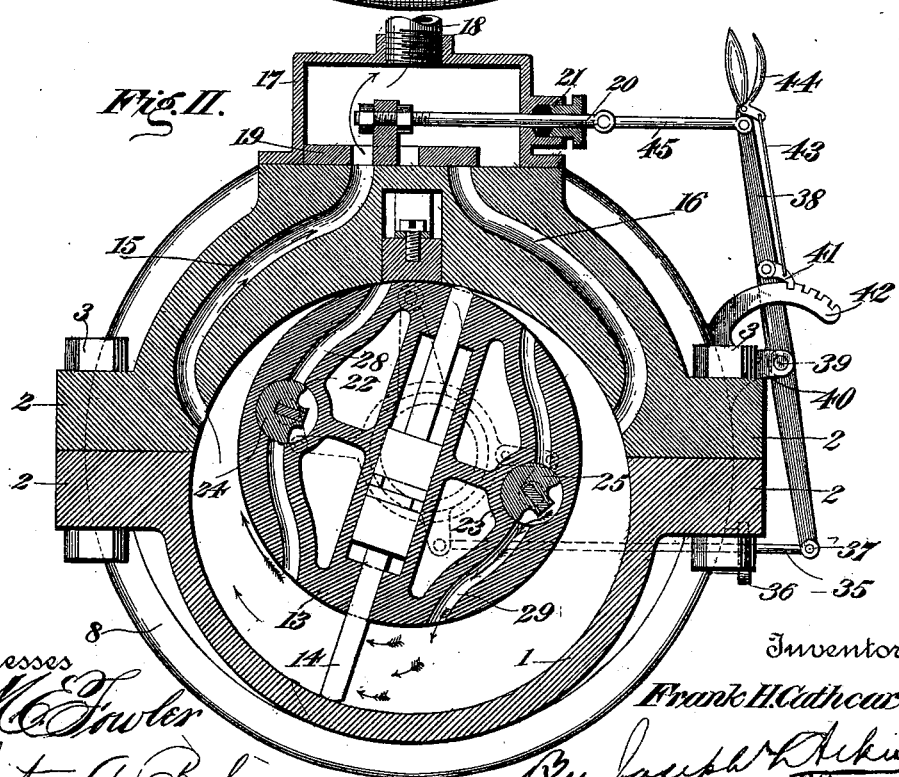
Fig. II.
Witnesses
M. E. Fowler
Chester A. Baker
Inventor:
Frank H. Cathcart,
By Joseph L. Atkins
Attorney
THE NORRIS PETERS CO., PHOTO-LITHO., WASHINGTON, D. C.

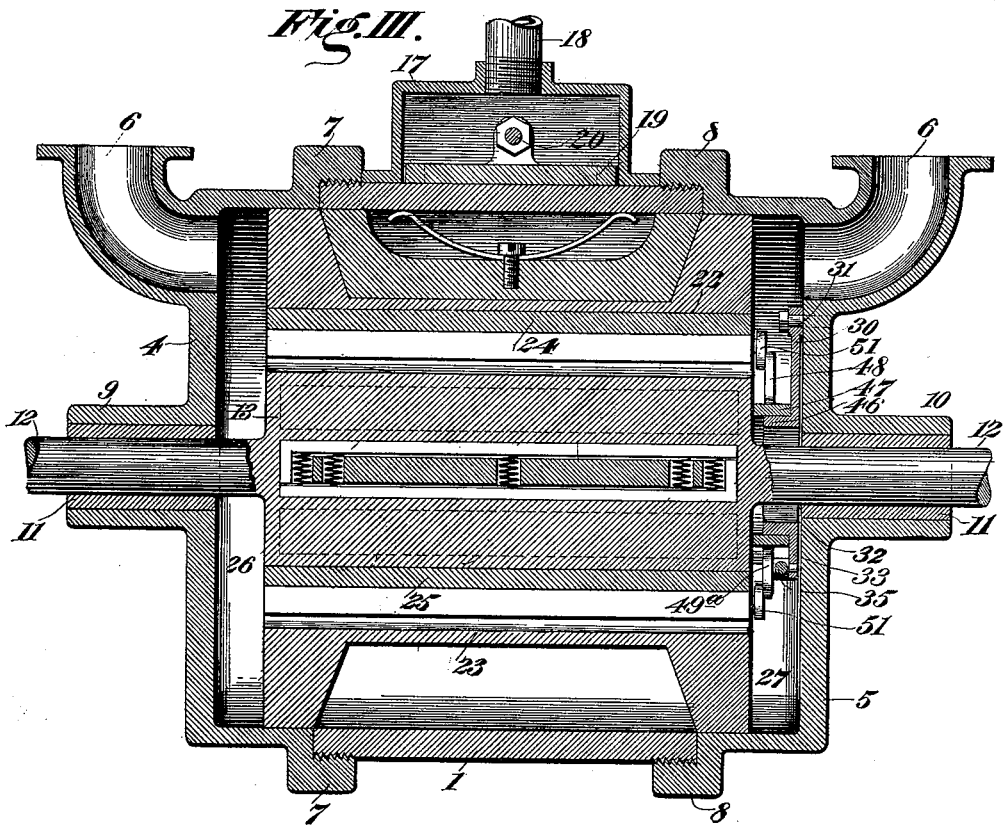

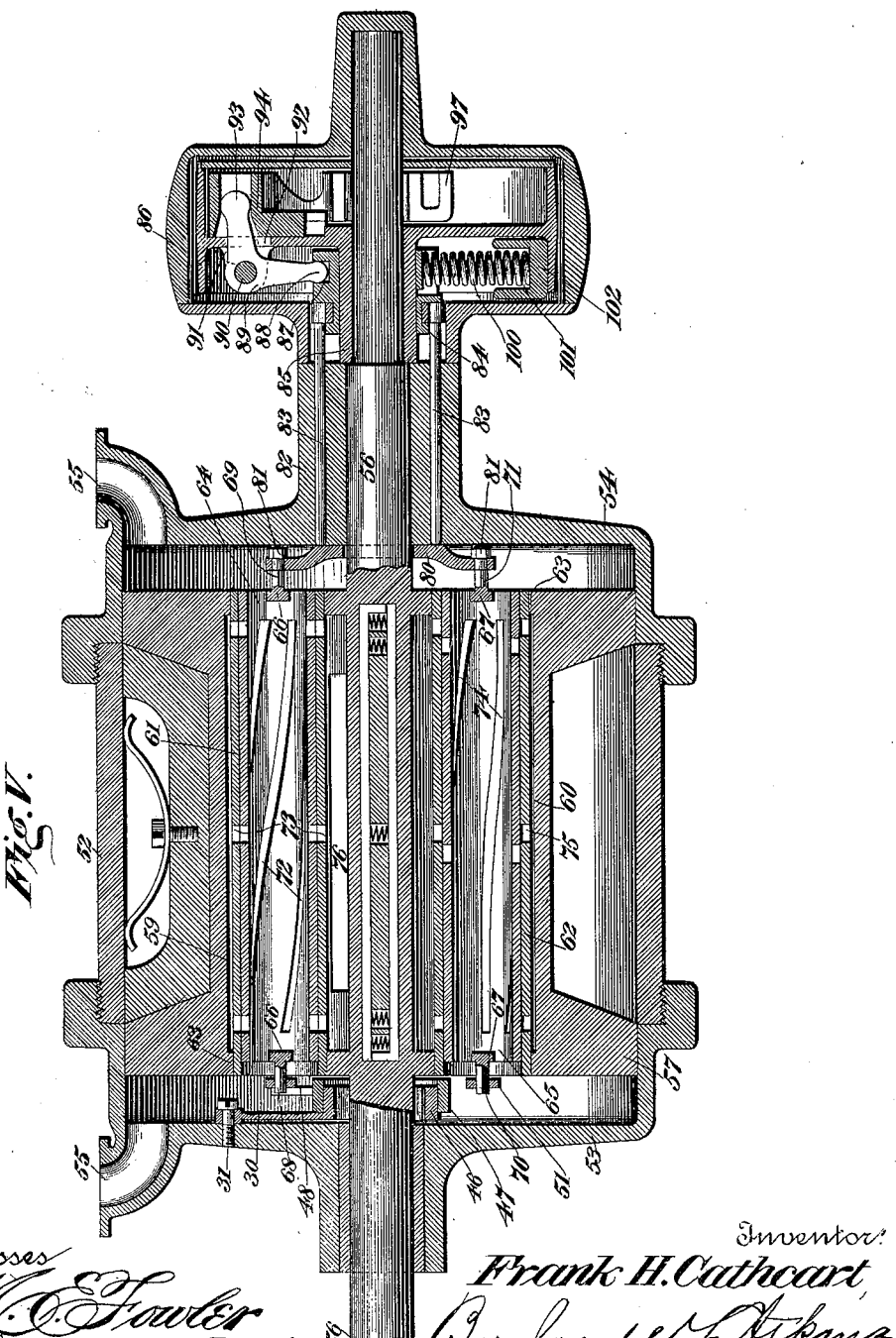

No. 630,590. Patented Aug. 8, 1899.
F. H. CATHCART.
ROTARY ENGINE.
(Application filed May 25, 1897.)
(No Model.) 9 Sheets—Sheet 4.
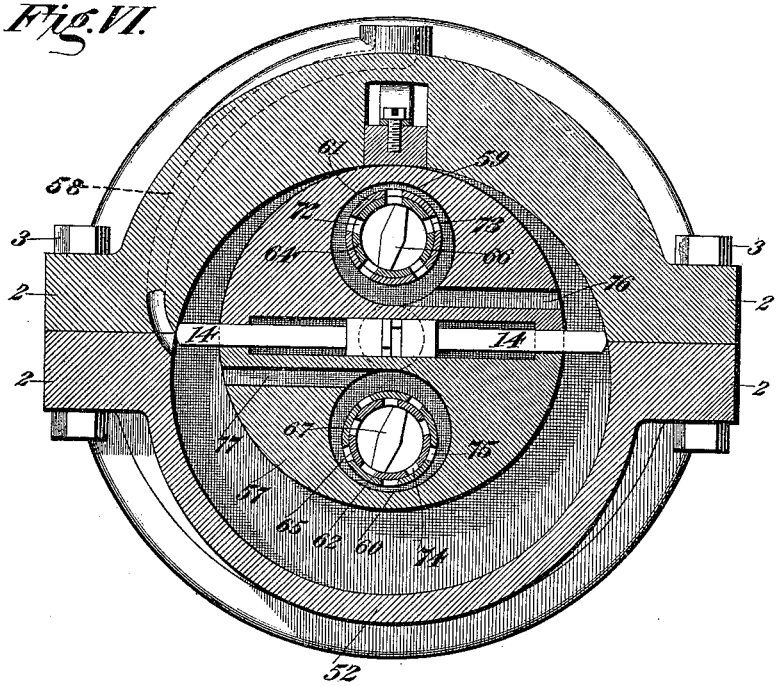
Fig. VI.
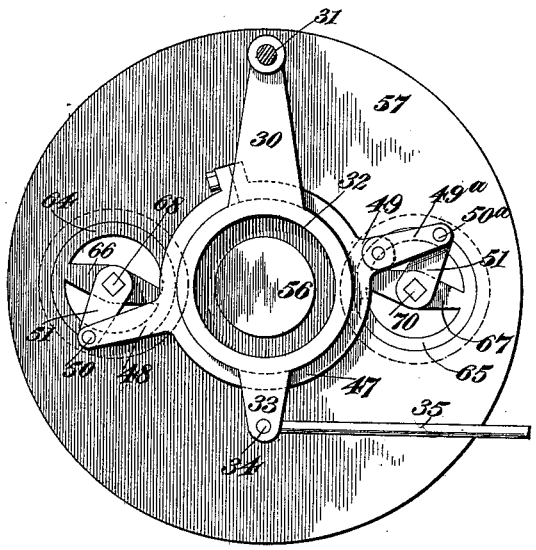
Fig. VII.
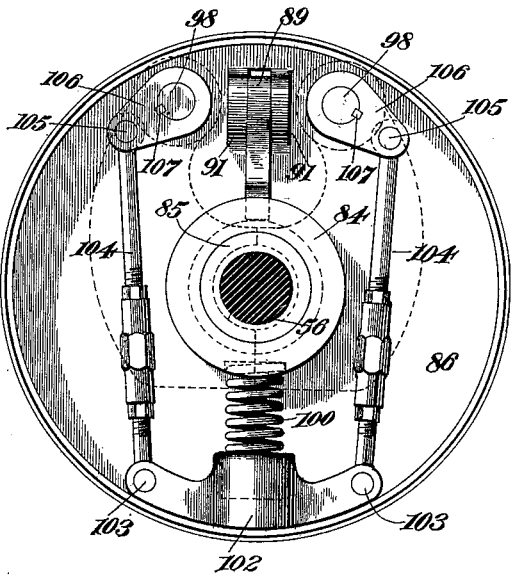
Fig. VIII.
Witnesses
M. E. Fowler
Chester A. Baker
Inventor:
Frank H. Cathcart,
By Joseph L. Atkins
Attorney.
THE NORRIS PETERS CO., PHOTO-LITHO., WASHINGTON, D. C.

No. 630,590. Patented Aug. 8, 1899.
F. H. CATHCART.
ROTARY ENGINE.
(Application filed May 25, 1897.)
(No Model.) 9 Sheets—Sheet 5.
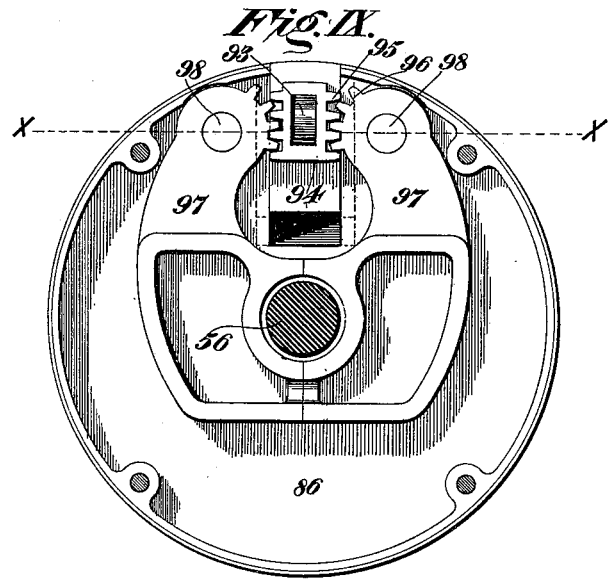
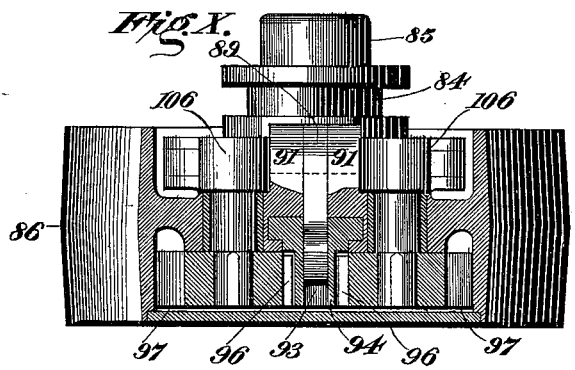
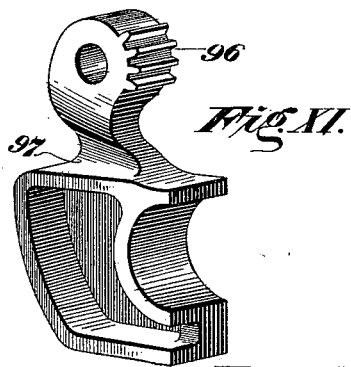
Witnesses
M. E. Fowler
Chester A. Baker
Inventor:
Frank H. Cathcart,
By Joseph L. Atkins
Attorney No. 630,590. Patented Aug. 8, 1899.
F. H. CATHCART.
ROTARY ENGINE.
(Application filed May 25, 1897.)
(No Model.) 9 Sheets—Sheet 6.
Fig. XII.
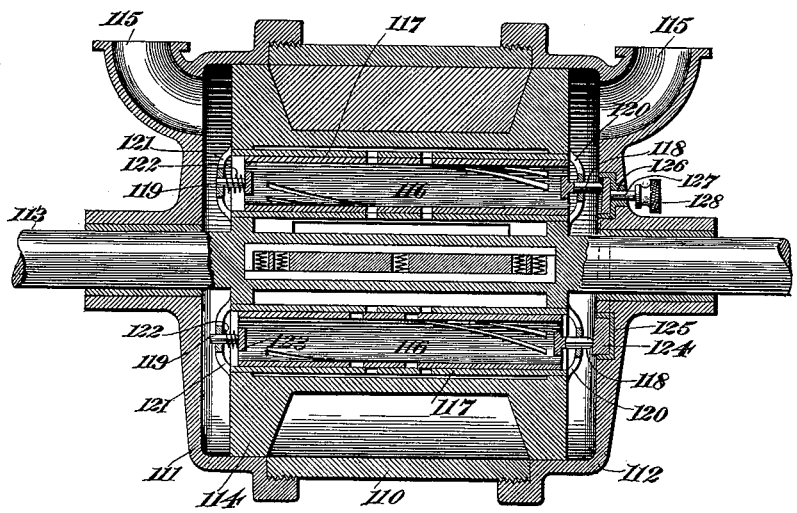
Fig. XIII.
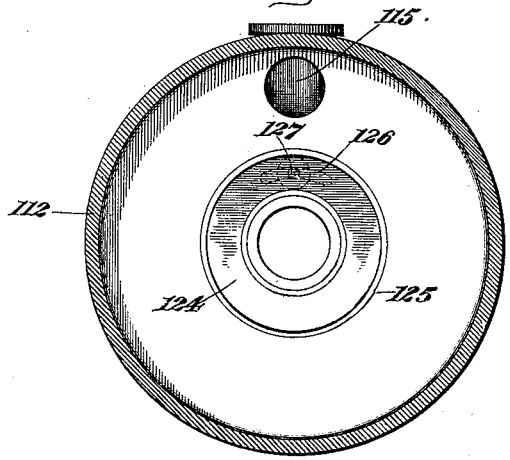
Witnesses  
M. E. Fowler  
Chester A. Baker.
Inventor  
Frank H. Cathcart,  
By Joseph L. Atkins,  
Attorney.
THE NORRIS PETERS CO., PHOTO-LITHO., WASHINGTON, D. C.

No. 630,590. Patented Aug. 8, 1899.
F. H. CATHCART.
ROTARY ENGINE.
(Application filed May 25, 1897.)
(No Model.) 9 Sheets—Sheet 7.
Fig. XIV.
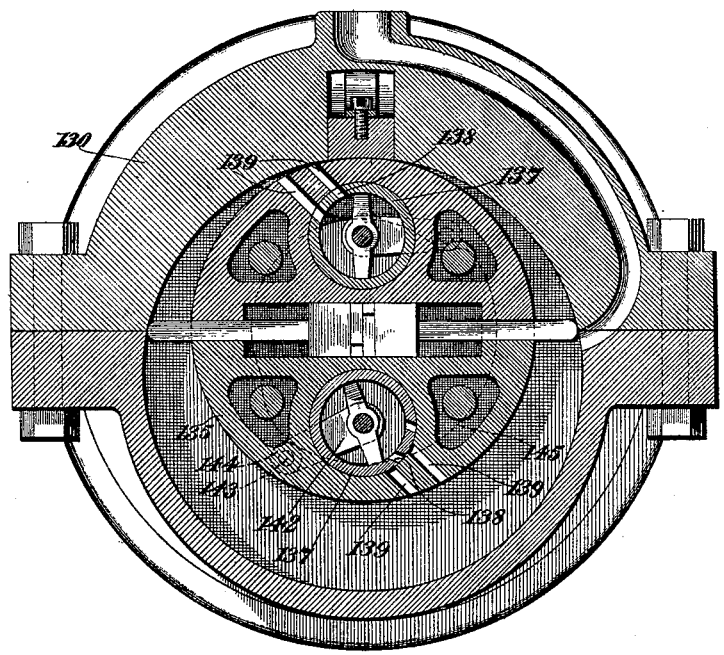
Fig. XV.
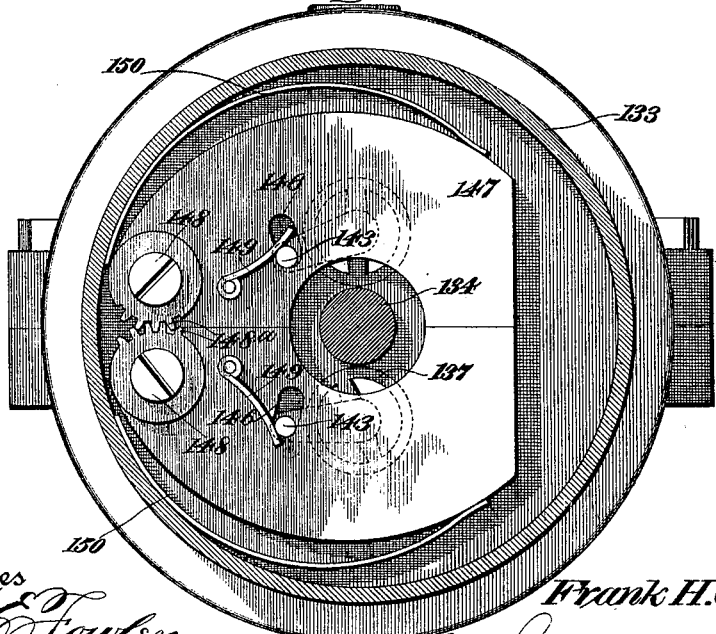
Witnesses
M. E. Fowler
Chester A. Baker.
Inventor:
Frank H. Cathcart,
By Joseph L. Atkins
Attorney.

No. 630,590. Patented Aug. 8, 1899.
F. H. CATHCART.
ROTARY ENGINE.
(Application filed May 25, 1897.)
(No Model.) 9 Sheets—Sheet 8.
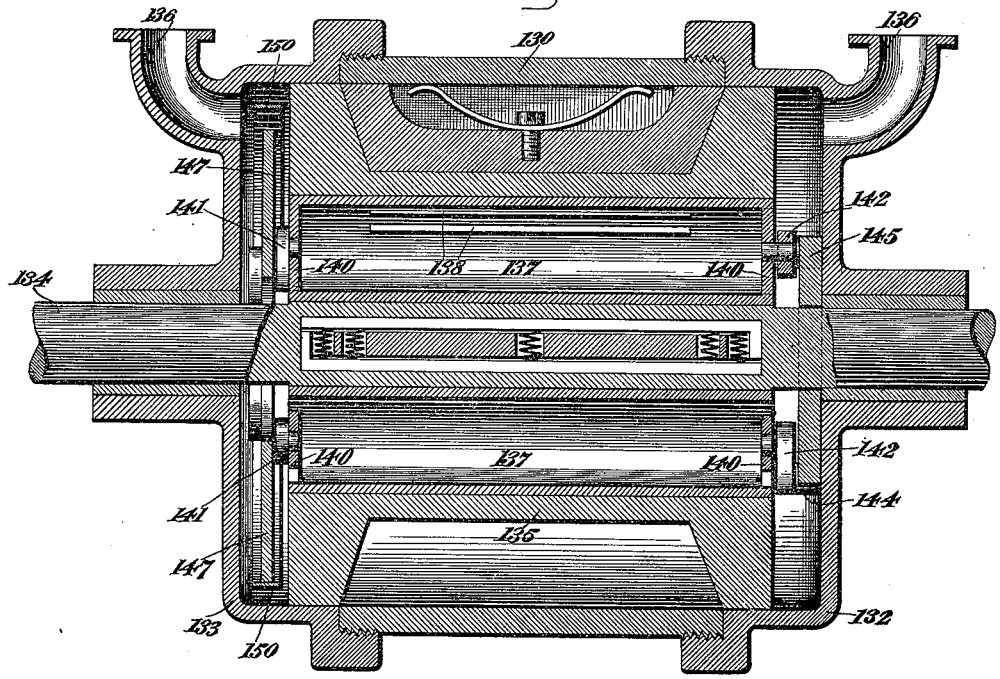
Fig. XVI.
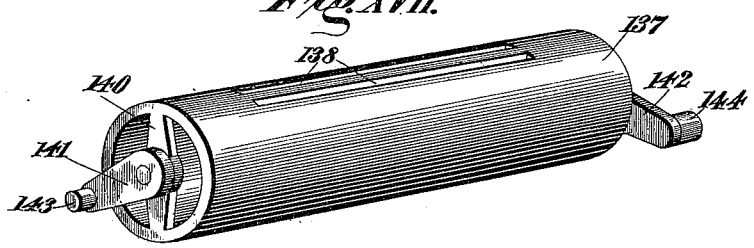
Fig. XVII.
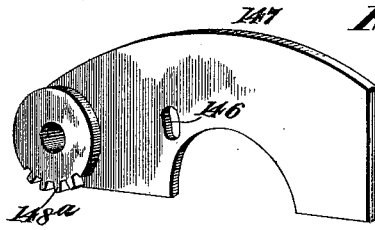
Fig. XVIII.
Witnesses
M. E. Fowler
Chester A. Baker.
Inventor:
Frank H. Cathcart,
By Joseph T. Atkins,
Attorney.
THE NORRIS PETERS CO., PHOTO-LITHO., WASHINGTON, D. C.

No. 630,590. Patented Aug. 8, 1899.
F. H. CATHCART.
ROTARY ENGINE.
(Application filed May 25, 1897.)
(No Model.) 9 Sheets—Sheet 9.
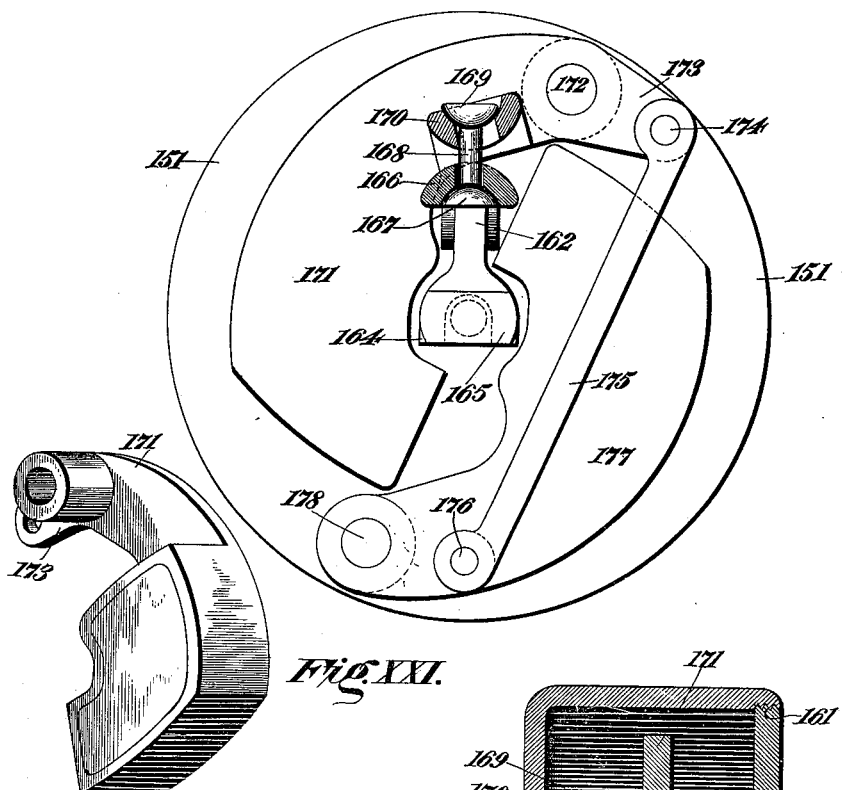
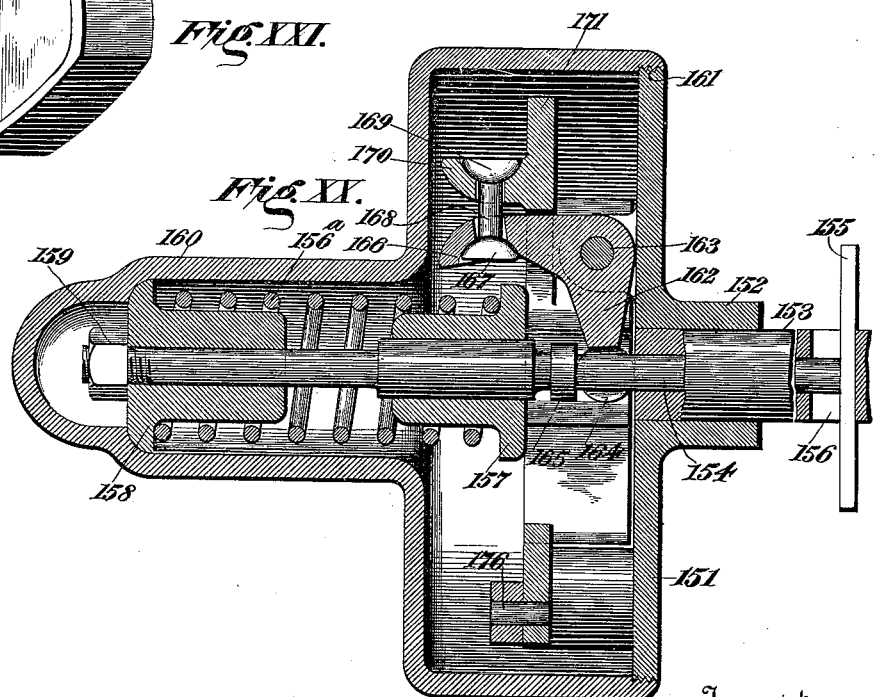
Witnesses
M. E. Fowler
Chester A. Baker.
Inventor
Frank H. Cathcart,
By Joseph T. Atkins
Attorney.

United States Patent Office.

FRANK H. CATHCART, OF ALEXANDRIA, VIRGINIA, ASSIGNOR TO THE EMPIRE ENGINE AND MOTOR COMPANY, OF NEW YORK, N. Y.

ROTARY ENGINE.

SPECIFICATION forming part of Letters Patent No. 630,590, dated August 8, 1899.

Application filed May 25, 1897. Serial No. 638,035. (No model.)

*To all whom it may concern:*

Be it known that I, FRANK H. CATHCART, of Alexandria, in the county of Alexandria, State of Virginia, have invented certain new and useful Improvements in Rotary Engines, of which the following is a complete specification, reference being had to the accompanying drawings.

The object of my invention is to produce improved means for controlling the fluid-pressure applied to drive a rotary engine and includes mechanism for producing a variable and automatic cut-off, mechanism for automatically controlling the speed of the engine or motor, and mechanism for reversing the movement of the engine.

A special and important feature of my invention consists in placing the cut-off valves and the reversible valves within the rotative piston of the engine.

My invention in its several generic and specific aspects is designed to be applied to any type of rotary motor, the particular variety shown in the drawings being illustrated for the purpose of example.

Under the term "rotary" engine or motor I include all machines which embody a rotary piston as distinguished, for example, from a reciprocatory piston and which are adapted to be driven by fluid-pressure. It should be understood, therefore, that when in the specification reference is made to steam as the actuating fluid it is merely mentioned as one of a variety of fluids which may be employed for the purpose.

In the accompanying drawings, Figure I is a section of a motor embodying one form of reversing and cut-off mechanism, taken transversely through the cylinder and piston and illustrating the valves closed and the mechanism at a standstill. Fig. II is a similar view showing the reversing mechanism shifted to open the valves, one being illustrated as open. Fig. III is a longitudinal section of the machine shown in Fig. I with the piston-heads in the horizontal position. Fig. IV is a view similar to Fig. II, illustrating by comparison with that figure the automatic cut-off operation of the valves. Fig. V is a longitudinal section of an engine, showing a modified form of valve automatically controllable by one form of governor. Fig. VI is a central vertical section of Fig. V. Fig. VII is an end view of the piston shown in Fig. V with the reversing-eccentric illustrated in position. Fig. VIII is a side elevation of the governor with the case removed, looking toward it from the position of the engine. Fig. IX is a view of the governor corresponding to that shown in Fig. VIII, but taken from the opposite side. Fig. X is a section on the line X X of Fig. IX. Fig. XI is a perspective view of one of the governor-counterweights shown in Fig. IX. Fig. XII illustrates in central longitudinal section an engine equipped with a simple form of automatic cut-off mechanism, the special reversing mechanism previously illustrated being omitted. This form of embodiment of my invention is peculiarly applicable to small motors. Fig. XIII is an inside view of the cylinder-head shown in Fig. XII, illustrative of the means for shifting the position of the annular cam that operates the valves. Fig. XIV is a transverse sectional view of an engine or motor, showing a modified form of valve. Fig. XV is an end elevation of the machine shown in Fig. XIV with one of the cylinder-heads removed, showing the centrifugal counterweights for actuating the valves. Fig. XVI is a longitudinal central section of the subject-matter of Fig. XIV with portions shown in elevation. Fig. XVII is a perspective view of one of the valves illustrated in Figs. XIV and XVI. Fig. XVIII is a perspective view of one of the centrifugal counterweights shown in Fig. XV detached. Fig. XIX is an elevation of a modified form of governor with the case removed. Fig. XX is a longitudinal section of the same, partially in elevation, with the case attached. Fig. XXI is a perspective view of one of the counterweights shown in Fig. XIX detached.

Referring first to the reference-numerals on Figs. I to IV, inclusive, of the drawings, 1 indicates the cylinder of the type of rotary engine illustrated by way of example. The cylinder, as illustrated, is in two parts and is provided with flanges 2, by which it is united, as by means of bolts 3. 4 indicates one of the cylinder-heads and 5 the other. 6 (see Fig. III)

indicates supply-ports which supply steam to the interior of the cylinder. As illustrated, the cylinder-heads are provided with annular flanges 7 and 8, which are internally screw-threaded to engage corresponding threads upon the opposite ends of the cylinder 1. The cylinder-heads are provided with suitable bearings or boxes 9 and 10, respectively, which carry, as in bushings 11, a piston-shaft 12. The piston 13, as illustrated, is of the well-known spool-shaped type, carried by its shaft 12 eccentrically within the hollow of the cylinder 1. It is provided with transversely-movable piston-heads 14, which engage with the opposite interior walls of the cylinder and serve under the propulsive force of fluid-pressure to impart rotary movement to the piston and its shaft. 15 and 16 indicate exhaust-passages which communicate with the interior of the cylinder and which may be cored out in the body of the cylinder-wall. The ports 15 and 16 communicate with a chest 17 and a common exhaust-pipe 18 and are controllable, as by means of a suitable slide-valve 19, actuated by a rod 20, working in a stuffing-box 21.

As above specified, the machine, taken as aforesaid as a type of rotary engine generally, is one of well-known construction so far as the features above enumerated are concerned.

Proceeding to the consideration of the distinguishing features which embody my invention, 22 and 23 indicate suitable valve-seats located within the body of the piston and which, as illustrated, are of cylindrical form. Within the valve-seats, respectively, I provide oscillatory valves 24 and 25, adapted, respectively, to receive steam from the chambers 26 and 27 within the cylinder-heads 4 and 5, respectively, and to discharge it alternately through transverse ports 28 and 29, respectively, into the interior of the cylinder 1 behind the piston-heads 14. The steam-spaces 26 and 27 are in constant communication one with the other through the open portions of the valve-seats 22 and 23, respectively, and, communicating equal steam-pressure to both ends of the piston, serve thereby to prevent end thrust upon the same. For this reason a single steam-supply port 6 may be employed, if preferred.

In order to impart to the respective valves requisite movements so that they shall alternately open and close during the rotation of the piston, so as to alternately supply steam to the interior of the cylinder 1 upon one side of the piston-head 14 and to permit its exhaust therefrom upon the other side of the piston-head, it is necessary to employ suitable valve-actuating mechanism. Such mechanism, as will hereinafter more clearly appear, may consist of mechanism which after being set manually will continue to perform its office automatically or of mechanism which performs its office altogether by automatic means, or it may consist in the embodiment of both types of valve-actuating mechanism in one machine. The first type of valve-actuating mechanism comprehends, as illustrated in Figs. I to IV, inclusive, reversing mechanism, inasmuch as the manual setting of the valves may be employed to partially open or close the valves so as to drive the piston in one direction or in the other, as required. The second type of valve-actuating mechanism is essentially a governor and as such may be employed in connection with or independent of such reversing mechanism as comprehends the manual setting of the valves within the piston.

The form of valve-actuating mechanism embodying reversing mechanism is clearly shown in Figs. I to IV, inclusive, of the drawings, and includes a pendent or oscillatory member 30, that is pivoted, as indicated at 31, to the interior of one of the cylinder-heads—for example, the head 5—and which carries an annulus 32, which is of greater diameter than the shaft 12, which it encircles. The annulus 32 terminates in a lug 33, to which, as indicated at 34, is pivotally united a rod 35, which passing through a stuffing-box 36 in the wall of the cylinder is externally pivoted, as indicated at 37, to the extremity of a quadrant-lever 38, which is pivoted, as indicated at 39, to an arm 40, projecting from the cylinder-head, and which may be adjusted to required position, as by means of a pawl 41, traveling over a notched quadrant 42. 43 indicates a rod which operatively connects the pawl with the usual handle 44. I prefer also to unite the stem 20 to the upper end of the lever 38, as by means of a link connection 45, in order that movement imparted to the member 30 through the lever 38 may be proportionately communicated to the valve 19. The movement of the member 30 in the manner to be hereinafter described controls the steam supplied to the cylinder, while, as above specified, the movement of the valve 19 controls the exhaust. The movements of those two members should therefore correspond with their relative functions. The member 30 is provided with an annular boss 46, (see Fig. III,) which affords a pivotal support for an annular strap 47. The strap 47 is provided upon one side with a radially-projecting arm 48 and upon the opposite side with a lug 49. The arm 48 is pivotally united, as indicated at 50, to the arm 51 of the valve 24, and the lug 49 is pivotally united to a link 49$^a$, which is also pivotally united, as indicated at 50$^a$, to the arm 51 of the valve 25. When by the movement of the lever 38 the member 30 is swung upon its pivot 31 to a position concentric with the shaft 12, (see dotted position, Fig. I,) the valves 24 and 25, respectively, are closed, so as to exclude steam from the valve-ports 28 and 29. Consequently the machine is brought to a standstill. If by the movement of the lever 38 the member 30 is swung to one side or the other of the shaft 12, (see dotted position, Fig. II,) one of the valves opens and, admitting steam against the piston-head 14, drives the piston. The direction of movement of the lever 37 determines the direction in which the piston will rotate. As the piston rotates the strap 47 turns upon its boss 46 and imparts alternate oscillatory movement to the valves, so as to open and close them, respectively, at required intervals to produce the necessary supply and exhaust of steam.

In Figs. V, VI, and VII of the drawings an engine of the type previously specified is illustrated, together with a modified form of valve mechanism. In these figures, 52 indicates a cylinder; 53 and 54, respective cylinder-heads; 55, steam-supply ports; 56, a piston-shaft; 57, a piston, and 58 the exhaust-port. Extending longitudinally through the piston upon opposite sides of its longitudinal axis I provide bores 59 and 60 and within the same valve-shells 61 and 62 of smaller diameter and supported eccentrically therein, as upon end walls 63 of the piston. The shells may be formed integrally with the piston or may be made of separate inserted tubes. Fitting closely within the shells 61 and 62, respectively, I provide hollow cylindrical valves 64 and 65, which at their opposite ends are provided, respectively, with cross-pieces 66 and 67. The valve 64 is provided at its opposite ends with studs 68 and 69, respectively, which project in opposite directions from the cross-pieces 66, coaxially with the valve. The valve 65 is provided with corresponding studs 70 and 71, projecting in like manner from the cross-pieces 67. The valve 64 is provided with a series of longitudinally-disposed spiral slits 72, which are adapted to register with corresponding slits 73 in the valve-shell 61. The valve 65 has slits 74, corresponding to the slits 72, which register with slits 75 in the shell 62, corresponding to the slits 73. The valves 64 and 65 being hollow from end to end are adapted to receive steam from the supply-port 55, and when their respective slits register with the slits of their respective shells to deliver the steam through the valve-ports 76 and 77 (see Fig. VI) into the interior of the cylinder. When the slits of the valves 64 and 65 fail to register with the slits of their respective shells entirely or partially, steam is either entirely or partially cut off from the ports 76 and 77. The disalinement of the slits of the valves and their shells, respectively, may be produced either by slight rotary movement or by longitudinal movement of the valves within their shells, the spirality of the slits in the valve and their shells respectively providing the means for closing the slits through the longitudinal movement of the valves.

From the foregoing specification of the valves 64 and 65 and their correlative parts it will be apprehended that valve-actuating mechanism may be employed to operate the engine through control of the respective positions of the valves, for which purpose the machine may be provided with the actuating mechanism previously shown and described with reference to Figs. I to IV, inclusive. (See Fig. V.) The valve-actuating mechanism being the same as that previously described the same reference-numerals throughout have been assigned to its several elements.

The connection between the studs 68 and 70 and the valve-arms 51 may be a loose connection, as, indeed, it may be between the arms 51 and the valves 24 and 25, respectively. A loose connection is shown in Figs. V, VI, and VII, in which the studs 68 and 70 are illustrated as square and inserted into corresponding apertures in the arms 51. By this construction oscillatory movement may be imparted to the valves 64 and 65 through the movement of the member 30, as previously described, without preventing or impeding the longitudinal movement of the valves, through which, as above stated, they may be actuated to produce disalinement of their slits with the slits of their shells, respectively. I adopt the spirally-slitted valves with their spirally-slitted shells as an example of means of embodying in the same machine independent movements of the valves for distinct though relative purposes. As illustrated in Fig. V, the valves, with the valve-actuating mechanism already described, may be employed to drive the machine at a greater or less speed in one direction or the other, the operation of the machine being of course automatic upon manipulation of the valve-actuating mechanism. It is well known in practice, however, that the rate of speed of an engine or motor under constant conditions, as of steam-supply and the like, will be variable. I therefore contemplate the employment in addition to the valve-actuating mechanism variable and automatic cut-off mechanism for controlling the rate of speed of the motor. For that purpose I provide on the interior of the cylinder-head 54 a spanner 80, which encircling the shaft 56 is secured at its opposite ends, as by nuts 81, to the studs 69 and 71, respectively. Upon opposite sides of the shaft 56 in suitable apertures in the collar 82 of the cylinder-head 54 I provide rods 83, which are operatively connected at one end, respectively, to the spanner 80 and at the other end to a collar 84, that is loosely mounted upon the sleeve 85 upon the governor-frame 86. The collar is provided with a recess 87, within which works the bulbous or round head 88 of a bell-crank lever 89, mounted, as indicated at 90, upon the lugs 91, projecting from one side of the frame 86. The bell-crank lever works in an aperture 92 in the frame 86, and, extending through the frame, terminates in a second bulbous head 93, whereby it is loosely connected with a rack 94, provided upon opposite sides with teeth 95, which mesh with the teeth 96 of corresponding centrifugal counterweights 97, pivoted, as indicated at 98, to the frame 86. The counterweights 97 are adapted in the usual manner to separate under centrifugal force, and in so doing, through the engagement of their teeth 96 with the teeth 95 of the rack 94, impart movement to the bell-crank lever 89, which, through the collar 84 and the rods 83, force the spanner 80 toward the piston. The spanner 80 being secured to the studs 69 and 71 carries with it the valves 64 and 65, whose longitudinal movement is permitted by the loose connection between the studs 68 and 70 and the arms 51. By this arrangement if the speed of the shaft 56 exceeds a predetermined rate the counterweights 97 tend to reduce the speed by shutting off the supply of steam through the movement of the valves above described.

The resistance to the separation of the counterweights 97 may be imposed in the manner usual in governors of this class, as by means of a spring 100. I prefer to locate the spring, as clearly shown, for example, in Fig. VIII, upon the side of the frame 86 opposite to the counterweights 97. It is set at one end against the sleeve 85 and at the other end within a suitable socket 101 in a yoke 102. To the opposite ends of the yoke, respectively, are pivotally united, as indicated at 103, longitudinally-adjustable rods 104, which are pivotally united, as indicated at 105, respectively, to crank-arms 106, secured to the counterweights 97. The preferred construction for uniting the arms 106 to the counterweights is to make the pivot-pin 98 movable within the frame 86 and secure the crank-arms and the counterweights thereto, as by keys 107.

The longitudinal movements of the spirally-slitted valves in spirally-slitted cases or shells may be employed exclusively as an automatic alternating cut-off for the valves. Such a construction is especially applicable on account of its simplicity and compactness for use in small motors in which the limits of size and weight oppose objections to the employment of the more bulky reversing mechanism either alone or in connection with the governing mechanism. A motor exhibiting this construction is illustrated in Figs. XII and XIII, in which 110 indicates a cylinder; 111 and 112, the cylinder-heads; 113, the piston-shaft; 114, the piston, and 115 steam-supply ports. 116 indicates spirally-slitted valves working in spirally-slitted shells 117. Each of the valves is provided with coaxial studs 118 and 119, working, for example, in bearings provided in open-work frames 120 and 121. The studs 118 and 119 are preferably squared and work in corresponding bearings to prevent rotary movement of the valves. Each of the valves, as by a coiled spring 122, seated at one end against the frame 121 and at the other against the cross-piece 123, which supports the stud, is yieldingly urged toward the open position or that position in which the slits of the valves and their cases respectively register. For closing the valves alternately at proper intervals I provide in the path of the studs 118 an annular cam 124, mounted in a suitably-packed recess 125 in the inner face of the cylinder-head 112. The cam 124 may be revolubly adjustable within its recess for the purpose of regulating the cut-off point of the valve, for which purpose a slot 126 in the cylinder-head 111 may be provided, through which extends a pin 127, secured at one end to the cam and at the other end to a knurled head 128. Suitable packing may be provided for preventing leakage through the slot 126. The means for adjusting the cam 124 is merely illustrated by way of example.

In Figs. XIV to XVIII, inclusive, of the drawings I illustrate variable cut-off or governing mechanism for operating an exclusively oscillatory valve. In these figures, 130 indicates a cylinder; 132 133, cylinder-heads; 134, a piston-shaft; 135, a piston, and 136 steam-supply ports. Within the piston are mounted hollow cylindrical valves 137, (see Fig. XVII,) which are provided, preferably, with a plurality of longitudinally-disposed parallel slits 138, which are adapted to make or break joint with corresponding valve-ports 139 in the piston. Each valve is provided with a cross-piece 140, one of which carries a crank-arm 141 and the other a crank-arm 142. Each crank-arm is provided with a wrist-pin 143 and the arm 142 with an antifriction-roller 144, mounted on its wrist-pin. The roller works against a cam 145, formed upon or secured to the inner face of the cylinder-head 132. (Compare Figs. XIV and XVI.) The contour of the cam 145 is such as to afford the required alternate movement of the valves for the supply or exhaust of steam during the rotation of the piston. The wrist-pins of the crank-arms 141 are loosely secured, as by engaging with the walls of the slots 146 in the wings of centrifugal counterweights 147, pivoted, respectively, as indicated at 148, to the piston 135. The counterweights 147, connected, as by intermeshing teeth 148$^a$, are normally urged toward each other by suitable mechanism—as, for example, leaf-springs 150. (See Fig. XV.) To insure engagement of the rollers 144 with the periphery of the cam 145, I employ springs 149, secured to the respective counterweights and bearing against the wrist-pins 143. When the counterweights 147 are united, both valves are open, and when they are swung outwardly upon their pivots 148 both of the valves are closed partially or entirely. The shape of the contour of the cam 145 will cause an alternating outward movement of the valves independent of the counterweights, inasmuch as it is the office of the cam to alternately close the valves. The proper office of the counterweights is to automatically shut off the supply of steam. If the speed of the shaft 134 exceed a predetermined rate imposed by the power of the springs 150, both of the counterweights will turn upon their pivots and simultaneously shut off the supply of steam, whereupon the speed will decrease to normal and the oscillation of the counterweights 147 will serve to maintain it in the same manner in which the governing mechanism previously described maintains the rate of speed and in which centrifugal governors generally perform their functions.

In Figs. XIX to XXI of the drawings I illustrate a modified form of governing mechanism adapted to be used, for example, upon the type of machine shown in Fig. V. The governor illustrated in the three figures last referred to is designed to operate by a pull upon the valves instead of pressure applied, and if substituted for the governor shown in Fig. V would be incorporated with or employed in place of the cylinder-head 53 instead of the cylinder-head 54. In Figs. XIX to XXI, 151 indicates a governor-frame provided with a collar 152, secured to a piston-shaft 153. The shaft 153 is provided with an aperture within which works a rod 154, which, as by means of a cross-piece 155, working in a slot 156 in the piston-shaft, is operatively connected with the valves within the piston. (Not illustrated.) The rod 154 is normally urged toward the piston and in turn normally opens the valves therein, as by means of a coiled spring 156$^a$, supported at one end upon a seat 157, secured to the rod 154, and at the other end against the disk-head 158, through which a smooth portion of the rod passes and which is held in place, as by a nut 159, secured upon the end of the rod 154. A case 160 of suitable contour surrounds the spring and other mechanism of the governor and is secured, as by screw-threads 161, to the frame 151, thereby serving to hold the rod in place and to limit the movement of the disk-head 158. 162 indicates a bell-crank lever pivoted, as indicated at 163, to the framework 151. It is provided with a bifurcated end 164, which spans the rod 154 and engages a boss or projection 165, secured to the rod. The opposite end 166 of the lever 162 is dish-shaped to receive the head 167 of a link 168, which passes through a loosely-fitting aperture in the end 166 of the lever and which is provided with a head 169, that is supported in a dish-shaped lug 170 of a centrifugal counterweight 171, pivoted, as indicated at 172, (see Fig. XIX,) to the frame 151. The counterweight is provided with a spur 173, which is pivoted, as indicated at 174, to a link 175, which is pivoted, as indicated at 176, to a second counterweight 177, also pivoted, as indicated at 178, to the frame 151. By means of the link connection 175 the movements of the two counterweights are rendered mutual and interdependent. Through the connection of the bell-crank lever 162 with a counterweight 171 and the actuation of the bell-crank lever by the spring 156$^a$ the counterweights are normally urged toward each other, as shown in Fig. XIX, which, as above specified, is the condition under which the piston-valves are fully open. If the shaft 153, carrying the governor and its case, should exceed in speed the predetermined rate imposed by the spring 156$^a$, the counterweights 171 and 177 fly outwardly, turning upon their respective pivots 172 and 178. The movement of the counterweight 171 is communicated through the link 168 to the end 166 of the bell-crank lever 162 and from the bifurcated end 164 of the bell-crank lever upon the boss 165 of the rod 154, thereby actuating the rod against the force of its spring 156$^a$ and tending to close the piston-valves with which the rod is, as above specified, connected.

What I claim is—

1. In a rotary engine, the combination with its piston and cylinder, of a valve carried in the piston, automatic valve-actuating mechanism adapted automatically to supply steam to the piston for driving it, and means for adjusting said valve-actuating mechanism, substantially as set forth.

2. In a rotary engine, the combination with its piston and cylinder, of an oscillatory valve carried in the piston, and automatic valve-actuating mechanism, substantially as set forth.

3. In a rotary engine, the combination with its piston and cylinder, of an oscillatory longitudinally-movable valve carried within the piston, and valve-actuating mechanism, substantially as set forth.

4. In a rotary engine, the combination with its piston and cylinder, of a valve-shell carried in the piston and partially separated therefrom, a valve carried in the shell, apertures in the shell and valve, respectively, and valve-actuating mechanism, substantially as set forth.

5. In a rotary engine, the combination with its piston and cylinder, of a valve in the piston, apertures in the piston and valve, respectively, and automatic valve-actuating mechanism, substantially as set forth.

6. In a rotary engine, the combination with its piston and cylinder, of a valve working in the piston, parallel elongated apertures in the valve, and piston, respectively, and valve-actuating mechanism, substantially as set forth.

7. In a rotary engine, the combination with its piston and cylinder, of a valve working in the piston, spiral apertures in the valve and piston, respectively, and valve-actuating mechanism, substantially as set forth.

8. In a rotary engine, the combination with a cylinder, of a piston therein, the adjacent end walls of the piston and cylinder defining chambers, an annular steam-space intermediate of the ends of the piston, movable heads carried by the piston and designed to extend into said steam-space, valves controlling the ingress of steam to the annular steam-space from one of the chambers at the ends of the cylinder, and means for supplying steam to said chamber, substantially as specified.

9. In a rotary engine, the combination with a cylinder, piston and piston-heads, of a hollow valve working in the piston, adapted to communicate steam-pressure from one end to the other thereof, of correlative apertures in the valve and piston, respectively, adapted to supply steam-pressure behind the piston-heads at required intervals, and valve-actuating mechanism, substantially as and for the purpose specified.

10. In a rotary engine, the combination with its cylinder, piston and piston-heads, of a valve-seat extending from end to end through the piston, a valve partially occupying the same, means for communicating steam-pressure through the valve to the piston-heads at required intervals, and valve-actuating mechanism, substantially as set forth.

11. In a rotary engine, the combination with its piston and cylinder, of an oscillatory valve working in the piston, apertures in the valve and piston, respectively, and mechanism for automatically actuating the valves through the rotation of the piston within the cylinder, substantially as set forth.

12. In a rotary engine, the combination with its cylinder and piston inclosed therein, of a cut-off and reversing valve carried within the piston, and mechanism upon the exterior of the cylinder and operatively connected with said valve to accomplish the reversing and to set the valve for the purpose of determining the extent of the cut-off, substantially as specified.

13. In a rotary engine, the combination with its cylinder and a piston inclosed therein, of controlling-valves carried in the piston, automatic valve-actuating mechanism within the cylinder and operatively connected with the valves, and automatic cut-off mechanism located outside of the cylinder and operatively connected with the valves within the piston, substantially as specified.

14. In a rotary engine, the combination with its cylinder and inclosed piston, of an oscillatory and longitudinally-movable valve carried within the piston, means for effecting the oscillation of the valve to permit the intermittent delivery of steam, and means for automatically moving the valve longitudinally to effect the cut-off, substantially as specified.

15. In a rotary engine, the combination with its cylinder and inclosed piston, of an apertured valve-shell, an apertured hollow valve within the shell, valve-actuating mechanism, and means for supplying fluid under pressure to the interior of the cylinder whereby said fluid may pass entirely through the hollow valve to accomplish the balancing of the piston and may when the valve is in the proper position pass from the valve through the shell to the point at which its energy is designed to be utilized, substantially as specified.

16. In a rotary engine, the combination with its cylinder and inclosed piston, of heads carried by the piston, apertured valve-shells within the piston, hollow apertured valves extending through the piston from end to end, said piston being provided with passages leading to its periphery from the valve-shells, and valve-actuating mechanism, substantially as specified.

17. In a rotary engine, the combination with its cylinder and piston, of a valve working within the piston, said valve and piston being provided with spiral apertures, means for oscillating said valve, and means for moving said valve longitudinally, substantially as specified.

18. In a rotary engine, the combination with its cylinder and piston, of a valve working within the piston, said valve and piston being provided respectively, with spiral apertures, and automatic actuating valve mechanism for oscillating the valve and for moving the valve longitudinally to effect the cut-off, substantially as specified.

19. In a rotary engine, the combination with its cylinder and piston, of a valve in the piston, said piston and valve being provided respectively with spiral apertures, mechanism upon the interior of the cylinder for automatically oscillating the valve, and automatic cut-off mechanism upon the exterior of the cylinder arranged to move the valve longitudinally, substantially as specified.

20. In a rotary engine, the combination with its cylinder and piston, longitudinally-movable valves in the piston, studs upon the ends thereof, and an actuating-cam in one of the cylinder-heads engaging with the studs of the valves, substantially as set forth.

21. In a rotary engine, the combination with its cylinder and piston, longitudinally-movable valves in the piston, studs upon the ends thereof, and an adjustable cam in one of the piston-heads engaging with the studs of the valves, substantially as set forth.

22. In a rotary engine, the combination with its cylinder and piston, of oscillatory and longitudinally-movable valves within the piston, studs upon the ends of said valves, an actuating-cam in one of the cylinder-heads engaging the studs of said valves and designed to actuate them longitudinally, and means for effecting the oscillation of the valves through the rotation of the piston, substantially as specified.

23. In a rotary engine, the combination with its cylinder and piston, of controlling-valves carried by the piston, an exhaust-valve upon the exterior of the cylinder, and actuating mechanism common to all of said valves, substantially as specified.

24. In a rotary engine, the combination with its cylinder and piston, of valves within the piston, an oscillatory member within the cylinder and operatively connected with the valves, an exhaust-valve upon the exterior of the cylinder, and mechanism for operating the oscillatory member and the exhaust-valve simultaneously, substantially as specified.

25. In a rotary engine, the combination with its cylinder and piston, of valves in the piston, an oscillatory member upon one of the cylinder-heads, oscillatory valves in the piston, and mechanism operatively connecting the oscillatory member with the oscillatory valves, substantially as and for the purpose specified.

26. In a rotary engine, the combination with its cylinder and piston, of a plurality of valves carried within the piston, an element, as for instance, a strap intermediate of and operatively connected with the said valves, and means for shifting the position of the said element, substantially as specified.

27. In a rotary engine, the combination with its cylinder and piston, of a plurality of oscillatory valves carried within the piston, arms extending from said valves, an annular strap operatively connected with the said arms, and an oscillatory member supporting the strap and designed to effect its adjustment for the purpose of actuating the valves, substantially as specified.

28. In a rotary engine, the combination with its cylinder and piston, of an oscillatory member upon the cylinder-head, oscillatory valves in the piston, a strap movably secured upon the oscillatory member, and loose connections between the valves and the strap, substantially as and for the purpose specified.

29. In a rotary engine, the combination with its cylinder and piston, of an oscillatory member upon one of the cylinder-heads, oscillatory valves in the piston, mechanism operatively connecting the oscillatory member with the oscillatory valves, and mechanism for operatively fixing the position of the oscillatory member, substantially as and for the purpose specified.

In testimony of all which I have hereunto subscribed my name.

FRANK H. CATHCART.

Witnesses:
JOSEPH L. ATKINS,
J. KENNEDY.